United States Patent
Tsai et al.

(10) Patent No.: US 11,898,918 B2
(45) Date of Patent: Feb. 13, 2024

(54) TEMPERATURE COEFFICIENT OF OFFSET COMPENSATION FOR FORCE SENSOR AND STRAIN GAUGE

(71) Applicant: NextInput, Inc., Mountain View, CA (US)

(72) Inventors: Julius Minglin Tsai, San Jose, CA (US); Dan Benjamin, Atlanta, GA (US)

(73) Assignee: NextInput, Inc., Mountain View, CA (US)

( * ) Notice: Subject to any disclaimer, the term of this patent is extended or adjusted under 35 U.S.C. 154(b) by 0 days.

(21) Appl. No.: 18/103,465

(22) Filed: Jan. 30, 2023

(65) Prior Publication Data

US 2023/0184603 A1 Jun. 15, 2023

Related U.S. Application Data

(63) Continuation of application No. 16/757,225, filed as application No. PCT/US2018/056245 on Oct. 17, 2018, now Pat. No. 11,579,028.

(60) Provisional application No. 62/573,271, filed on Oct. 17, 2017.

(51) Int. Cl.
  *G01L 1/22* (2006.01)
  *G01L 1/16* (2006.01)
  *G01L 1/18* (2006.01)

(52) U.S. Cl.
  CPC .............. *G01L 1/2281* (2013.01); *G01L 1/16* (2013.01); *G01L 1/18* (2013.01)

(58) Field of Classification Search
  CPC ............ G01L 1/2281; G01L 1/16; G01L 1/18
  See application file for complete search history.

(56) References Cited

U.S. PATENT DOCUMENTS

| | | | |
|---|---|---|---|
| 4,276,533 A | 6/1981 | Tominaga et al. | |
| 4,594,639 A | 6/1986 | Kuisma | |
| 4,658,651 A | 4/1987 | Le | |
| 4,814,856 A | 3/1989 | Kurtz et al. | |
| 4,842,685 A | 6/1989 | Adams | |

(Continued)

FOREIGN PATENT DOCUMENTS

| CN | 101341459 A | 1/2009 |
|---|---|---|
| CN | 101458134 A | 6/2009 |

(Continued)

OTHER PUBLICATIONS

Non-Final Office Action for U.S. Appl. No. 16/485,026, dated Apr. 28, 2021, 13 pages.

(Continued)

*Primary Examiner* — Octavia Davis Hollington
(74) *Attorney, Agent, or Firm* — Withrow & Terranova, P.L.L.C.

(57) ABSTRACT

MEMS force sensors for providing temperature coefficient of offset (TCO) compensation are described herein. An example MEMS force sensor can include a TCO compensation layer to minimize the TCO of the force sensor. The bottom side of the force sensor can be electrically and mechanically mounted on a package substrate while the TCO compensation layer is disposed on the top side of the sensor. It is shown the TCO can be reduced to zero with the appropriate combination of Young's modulus, thickness, and/or thermal coefficient of expansion (TCE) of the TCO compensation layer.

20 Claims, 6 Drawing Sheets

(56) References Cited

U.S. PATENT DOCUMENTS

| | | |
|---|---|---|
| 4,849,730 A | 7/1989 | Izumi et al. |
| 4,914,624 A | 4/1990 | Dunthorn |
| 4,918,262 A | 4/1990 | Towers et al. |
| 4,933,660 A | 6/1990 | Wynne, Jr. |
| 4,983,786 A | 1/1991 | Stevens et al. |
| 5,095,401 A | 3/1992 | Zavracky et al. |
| 5,159,159 A | 10/1992 | Asher |
| 5,166,612 A | 11/1992 | Murdock |
| 5,237,879 A | 8/1993 | Speeter |
| 5,291,795 A | 3/1994 | Hafner |
| 5,320,705 A | 6/1994 | Fujii et al. |
| 5,333,505 A | 8/1994 | Takahashi et al. |
| 5,343,220 A | 8/1994 | Veasy et al. |
| 5,349,746 A | 9/1994 | Gruenwald et al. |
| 5,351,550 A | 10/1994 | Maurer |
| 5,483,994 A | 1/1996 | Maurer |
| 5,510,812 A | 4/1996 | O'Mara et al. |
| 5,541,372 A | 7/1996 | Baller et al. |
| 5,543,591 A | 8/1996 | Gillespie et al. |
| 5,565,657 A | 10/1996 | Merz |
| 5,600,074 A | 2/1997 | Marek et al. |
| 5,661,245 A | 8/1997 | Svoboda et al. |
| 5,673,066 A | 9/1997 | Toda et al. |
| 5,679,882 A | 10/1997 | Gerlach et al. |
| 5,760,313 A | 6/1998 | Guentner et al. |
| 5,773,728 A | 6/1998 | Tsukada et al. |
| 5,780,727 A | 7/1998 | Gimzewski et al. |
| 5,889,236 A | 3/1999 | Gillespie et al. |
| 5,921,896 A | 7/1999 | Boland |
| 5,969,591 A | 10/1999 | Fung |
| 5,994,161 A | 11/1999 | Bitko et al. |
| 6,012,336 A | 1/2000 | Eaton et al. |
| 6,028,271 A | 2/2000 | Gillespie et al. |
| 6,128,961 A | 10/2000 | Haronian |
| 6,159,166 A | 12/2000 | Chesney et al. |
| 6,243,075 B1 | 6/2001 | Fishkin et al. |
| 6,348,663 B1 | 2/2002 | Schoos et al. |
| 6,351,205 B1 | 2/2002 | Armstrong |
| 6,360,598 B1 | 3/2002 | Calame et al. |
| 6,437,682 B1 | 8/2002 | Vance |
| 6,555,235 B1 | 4/2003 | Aufderheide et al. |
| 6,556,189 B1 | 4/2003 | Takahata et al. |
| 6,569,108 B2 | 5/2003 | Sarvazyan et al. |
| 6,610,936 B2 | 8/2003 | Gillespie et al. |
| 6,620,115 B2 | 9/2003 | Sarvazyan et al. |
| 6,629,343 B1 | 10/2003 | Chesney et al. |
| 6,668,230 B2 | 12/2003 | Mansky et al. |
| 6,720,712 B2 | 4/2004 | Scott et al. |
| 6,788,297 B2 | 9/2004 | Itoh et al. |
| 6,801,191 B2 | 10/2004 | Mukai et al. |
| 6,809,280 B2 | 10/2004 | Divigalpitiya et al. |
| 6,812,621 B2 | 11/2004 | Scott |
| 6,822,640 B2 | 11/2004 | Derocher |
| 6,868,731 B1 | 3/2005 | Gatesman |
| 6,879,318 B1 | 4/2005 | Chan et al. |
| 6,888,537 B2 | 5/2005 | Benson et al. |
| 6,915,702 B2 | 7/2005 | Omura et al. |
| 6,931,938 B2 | 8/2005 | Knirck et al. |
| 6,946,742 B2 | 9/2005 | Karpman |
| 6,995,752 B2 | 2/2006 | Lu |
| 7,138,984 B1 | 11/2006 | Miles |
| 7,173,607 B2 | 2/2007 | Matsumoto et al. |
| 7,190,350 B2 | 3/2007 | Roberts |
| 7,215,329 B2 | 5/2007 | Yoshikawa et al. |
| 7,218,313 B2 | 5/2007 | Marcus et al. |
| 7,224,257 B2 | 5/2007 | Morikawa |
| 7,245,293 B2 | 7/2007 | Hoshino et al. |
| 7,273,979 B2 | 9/2007 | Christensen |
| 7,280,097 B2 | 10/2007 | Chen et al. |
| 7,318,349 B2 | 1/2008 | Vaganov et al. |
| 7,324,094 B2 | 1/2008 | Moilanen et al. |
| 7,324,095 B2 | 1/2008 | Sharma |
| 7,336,260 B2 | 2/2008 | Martin et al. |
| 7,337,085 B2 | 2/2008 | Soss |
| 7,343,233 B2 | 3/2008 | Min et al. |
| 7,345,680 B2 | 3/2008 | David |
| 7,367,232 B2 | 5/2008 | Vaganov et al. |
| 7,406,661 B2 | 7/2008 | Vaananen et al. |
| 7,425,749 B2 | 9/2008 | Hartzell et al. |
| 7,426,873 B1 | 9/2008 | Kholwadwala et al. |
| 7,449,758 B2 | 11/2008 | Axelrod et al. |
| 7,460,109 B2 | 12/2008 | Safai et al. |
| 7,476,952 B2 | 1/2009 | Vaganov et al. |
| 7,508,040 B2 | 3/2009 | Nikkel et al. |
| 7,554,167 B2 | 6/2009 | Vaganov |
| 7,571,647 B2 | 8/2009 | Takemasa et al. |
| 7,607,111 B2 | 10/2009 | Vaananen et al. |
| 7,620,521 B2 | 11/2009 | Breed et al. |
| 7,629,969 B2 | 12/2009 | Kent |
| 7,637,174 B2 | 12/2009 | Hirabayashi |
| 7,649,522 B2 | 1/2010 | Chen et al. |
| 7,663,612 B2 | 2/2010 | Bladt |
| 7,685,538 B2 | 3/2010 | Fleck et al. |
| 7,698,084 B2 | 4/2010 | Soss |
| 7,701,445 B2 | 4/2010 | Inokawa et al. |
| 7,746,327 B2 | 6/2010 | Miyakoshi |
| 7,772,657 B2 | 8/2010 | Vaganov |
| 7,791,151 B2 | 9/2010 | Vaganov et al. |
| 7,819,998 B2 | 10/2010 | David |
| 7,825,911 B2 | 11/2010 | Sano et al. |
| 7,829,960 B2 | 11/2010 | Takizawa |
| 7,832,284 B2 | 11/2010 | Hayakawa et al. |
| 7,880,247 B2 | 2/2011 | Vaganov et al. |
| 7,903,090 B2 | 3/2011 | Soss et al. |
| 7,921,725 B2 | 4/2011 | Silverbrook et al. |
| 7,938,028 B2 | 5/2011 | Hirabayashi et al. |
| 7,952,566 B2 | 5/2011 | Poupyrev et al. |
| 7,973,772 B2 | 7/2011 | Gettemy et al. |
| 7,973,778 B2 | 7/2011 | Chen |
| 8,004,052 B2 | 8/2011 | Vaganov |
| 8,004,501 B2 | 8/2011 | Harrison |
| 8,013,843 B2 | 9/2011 | Pryor |
| 8,026,906 B2 | 9/2011 | Molne et al. |
| 8,044,929 B2 | 10/2011 | Baldo et al. |
| 8,051,705 B2 | 11/2011 | Kobayakawa |
| 8,068,100 B2 | 11/2011 | Pryor |
| 8,072,437 B2 | 12/2011 | Miller et al. |
| 8,072,440 B2 | 12/2011 | Pryor |
| 8,096,188 B2 | 1/2012 | Wilner |
| 8,113,065 B2 | 2/2012 | Ohsato et al. |
| 8,120,586 B2 | 2/2012 | Hsu et al. |
| 8,120,588 B2 | 2/2012 | Klinghult |
| 8,130,207 B2 | 3/2012 | Nurmi et al. |
| 8,134,535 B2 | 3/2012 | Choi et al. |
| 8,139,038 B2 | 3/2012 | Chueh et al. |
| 8,144,133 B2 | 3/2012 | Wang et al. |
| 8,149,211 B2 | 4/2012 | Hayakawa et al. |
| 8,154,528 B2 | 4/2012 | Chen et al. |
| 8,159,473 B2 | 4/2012 | Cheng et al. |
| 8,164,573 B2 | 4/2012 | DaCosta et al. |
| 8,183,077 B2 | 5/2012 | Vaganov et al. |
| 8,184,093 B2 | 5/2012 | Tsuiki |
| 8,188,985 B2 | 5/2012 | Hillis et al. |
| 8,196,477 B2 | 6/2012 | Ohsato et al. |
| 8,199,116 B2 | 6/2012 | Jeon et al. |
| 8,212,790 B2 | 7/2012 | Rimas Ribikauskas et al. |
| 8,220,330 B2 | 7/2012 | Miller et al. |
| 8,237,537 B2 | 8/2012 | Kurtz |
| 8,243,035 B2 | 8/2012 | Abe et al. |
| 8,250,921 B2 | 8/2012 | Nasiri et al. |
| 8,253,699 B2 | 8/2012 | Son |
| 8,260,337 B2 | 9/2012 | Periyalwar et al. |
| 8,269,731 B2 | 9/2012 | Molne |
| 8,289,288 B2 | 10/2012 | Whytock et al. |
| 8,289,290 B2 | 10/2012 | Klinghult |
| 8,297,127 B2 | 10/2012 | Wade et al. |
| 8,316,533 B2 | 11/2012 | Suminto et al. |
| 8,319,739 B2 | 11/2012 | Chu et al. |
| 8,325,143 B2 | 12/2012 | Destura et al. |
| 8,350,345 B2 | 1/2013 | Vaganov |
| 8,363,020 B2 | 1/2013 | Li et al. |
| 8,363,022 B2 | 1/2013 | Tho et al. |
| 8,378,798 B2 | 2/2013 | Bells et al. |
| 8,378,991 B2 | 2/2013 | Jeon et al. |

(56) References Cited

U.S. PATENT DOCUMENTS

| | | |
|---|---|---|
| 8,384,677 B2 | 2/2013 | Mak-Fan et al. |
| 8,387,464 B2 | 3/2013 | McNeil et al. |
| 8,405,631 B2 | 3/2013 | Chu et al. |
| 8,405,632 B2 | 3/2013 | Chu et al. |
| 8,421,609 B2 | 4/2013 | Kim et al. |
| 8,427,441 B2 | 4/2013 | Paleczny et al. |
| 8,436,806 B2 | 5/2013 | Almalki et al. |
| 8,436,827 B1 | 5/2013 | Zhai et al. |
| 8,448,531 B2 | 5/2013 | Schneider |
| 8,451,245 B2 | 5/2013 | Heubel et al. |
| 8,456,440 B2 | 6/2013 | Abe et al. |
| 8,466,889 B2 | 6/2013 | Tong et al. |
| 8,477,115 B2 | 7/2013 | Rekimoto |
| 8,482,372 B2 | 7/2013 | Kurtz et al. |
| 8,493,189 B2 | 7/2013 | Suzuki |
| 8,497,757 B2 | 7/2013 | Kurtz et al. |
| 8,516,906 B2 | 8/2013 | Umetsu et al. |
| 8,646,335 B2 | 2/2014 | Kotovsky |
| 8,833,172 B2 | 9/2014 | Chiou |
| 8,931,347 B2 | 1/2015 | Donzier et al. |
| 8,973,446 B2 | 3/2015 | Fukuzawa et al. |
| 8,984,951 B2 | 3/2015 | Landmann et al. |
| 8,991,265 B2 | 3/2015 | Dekker et al. |
| 9,032,818 B2 | 5/2015 | Campbell et al. |
| 9,097,600 B2 | 8/2015 | Khandani |
| 9,143,057 B1 | 9/2015 | Shah et al. |
| 9,182,302 B2 | 11/2015 | Lim et al. |
| 9,366,588 B2 | 6/2016 | Lee |
| 9,377,372 B2 | 6/2016 | Ogawa |
| 9,425,328 B2 | 8/2016 | Marx et al. |
| 9,446,944 B2 | 9/2016 | Ernst et al. |
| 9,464,952 B2 | 10/2016 | Pagani et al. |
| 9,487,388 B2 | 11/2016 | Brosh |
| 9,493,342 B2 | 11/2016 | Brosh |
| 9,574,954 B2 | 2/2017 | Baker et al. |
| 9,709,509 B1 | 7/2017 | Yang |
| 9,728,652 B2 | 8/2017 | Elian et al. |
| 9,772,245 B2 | 9/2017 | Besling et al. |
| 9,778,117 B2 | 10/2017 | Pagani |
| 9,791,303 B2 | 10/2017 | Pagani et al. |
| 9,823,144 B2 | 11/2017 | Fujisawa et al. |
| 9,835,515 B2 | 12/2017 | Pagani |
| 9,846,091 B2 | 12/2017 | Lu et al. |
| 9,851,266 B2 | 12/2017 | Nakamura et al. |
| 9,902,611 B2 | 2/2018 | Brosh et al. |
| 9,967,679 B2 | 5/2018 | Krumbein et al. |
| 9,970,831 B2 | 5/2018 | Shih |
| 9,983,084 B2 | 5/2018 | Pavone |
| 10,024,738 B2 | 7/2018 | Conti et al. |
| 10,067,014 B1 | 9/2018 | Tung et al. |
| 10,113,925 B2 | 10/2018 | Lai et al. |
| 10,488,284 B2 | 11/2019 | Jentoft et al. |
| 10,496,209 B2 | 12/2019 | Vummidi Murali et al. |
| 10,595,748 B2 | 3/2020 | Kubiak et al. |
| 10,598,578 B2 | 3/2020 | Pagani et al. |
| 10,724,909 B2 | 7/2020 | Abbasi Gavarti et al. |
| 10,962,427 B2 | 3/2021 | Youssefi et al. |
| 11,385,108 B2 | 7/2022 | Tsai et al. |
| 2001/0009112 A1 | 7/2001 | Delaye |
| 2003/0067448 A1 | 4/2003 | Park |
| 2003/0128181 A1 | 7/2003 | Poole |
| 2003/0189552 A1 | 10/2003 | Chuang et al. |
| 2004/0012572 A1 | 1/2004 | Sowden et al. |
| 2004/0140966 A1 | 7/2004 | Marggraff et al. |
| 2005/0083310 A1 | 4/2005 | Safai et al. |
| 2005/0166687 A1 | 8/2005 | Kaneko et al. |
| 2005/0190152 A1 | 9/2005 | Vaganov |
| 2006/0028441 A1 | 2/2006 | Armstrong |
| 2006/0244733 A1 | 11/2006 | Geaghan |
| 2006/0272413 A1 | 12/2006 | Vaganov et al. |
| 2006/0284856 A1 | 12/2006 | Soss |
| 2007/0035525 A1 | 2/2007 | Yeh et al. |
| 2007/0046649 A1 | 3/2007 | Reiner |
| 2007/0070046 A1 | 3/2007 | Sheynblat et al. |
| 2007/0070053 A1 | 3/2007 | Lapstun et al. |
| 2007/0097095 A1 | 5/2007 | Kim et al. |
| 2007/0103449 A1 | 5/2007 | Laitinen et al. |
| 2007/0103452 A1 | 5/2007 | Wakai et al. |
| 2007/0115265 A1 | 5/2007 | Rainisto |
| 2007/0132717 A1 | 6/2007 | Wang et al. |
| 2007/0137901 A1 | 6/2007 | Chen |
| 2007/0139391 A1 | 6/2007 | Bischoff |
| 2007/0152959 A1 | 7/2007 | Peters |
| 2007/0156723 A1 | 7/2007 | Vaananen |
| 2007/0182864 A1 | 8/2007 | Stoneham et al. |
| 2007/0229478 A1 | 10/2007 | Rosenberg et al. |
| 2007/0235231 A1 | 10/2007 | Loomis et al. |
| 2007/0245836 A1 | 10/2007 | Vaganov |
| 2007/0262965 A1 | 11/2007 | Hirai et al. |
| 2007/0277616 A1 | 12/2007 | Nikkel et al. |
| 2007/0298883 A1 | 12/2007 | Feldman et al. |
| 2008/0001923 A1 | 1/2008 | Hall et al. |
| 2008/0007532 A1 | 1/2008 | Chen |
| 2008/0010616 A1 | 1/2008 | Algreatly |
| 2008/0024454 A1 | 1/2008 | Everest |
| 2008/0030482 A1 | 2/2008 | Elwell et al. |
| 2008/0036743 A1 | 2/2008 | Westerman et al. |
| 2008/0083962 A1 | 4/2008 | Vaganov |
| 2008/0088600 A1 | 4/2008 | Prest et al. |
| 2008/0088602 A1 | 4/2008 | Hotelling |
| 2008/0094367 A1 | 4/2008 | Van De Ven et al. |
| 2008/0105057 A1 | 5/2008 | Wade |
| 2008/0105470 A1 | 5/2008 | Van De Ven et al. |
| 2008/0106523 A1 | 5/2008 | Conrad |
| 2008/0174852 A1 | 7/2008 | Hirai et al. |
| 2008/0180402 A1 | 7/2008 | Yoo et al. |
| 2008/0180405 A1 | 7/2008 | Han et al. |
| 2008/0180406 A1 | 7/2008 | Han et al. |
| 2008/0202249 A1 | 8/2008 | Yokura et al. |
| 2008/0204427 A1 | 8/2008 | Heesemans et al. |
| 2008/0211766 A1 | 9/2008 | Westerman et al. |
| 2008/0238446 A1 | 10/2008 | DeNatale et al. |
| 2008/0238884 A1 | 10/2008 | Harish |
| 2008/0259046 A1 | 10/2008 | Carsanaro |
| 2008/0284742 A1 | 11/2008 | Prest et al. |
| 2008/0303799 A1 | 12/2008 | Schwesig et al. |
| 2009/0027352 A1 | 1/2009 | Abele |
| 2009/0027353 A1 | 1/2009 | Im et al. |
| 2009/0046110 A1 | 2/2009 | Sadler et al. |
| 2009/0078040 A1 | 3/2009 | Ike et al. |
| 2009/0102805 A1 | 4/2009 | Meijer et al. |
| 2009/0140985 A1 | 6/2009 | Liu |
| 2009/0184921 A1 | 7/2009 | Scott et al. |
| 2009/0184936 A1 | 7/2009 | Algreatly |
| 2009/0213066 A1 | 8/2009 | Hardacker et al. |
| 2009/0237275 A1 | 9/2009 | Vaganov |
| 2009/0237374 A1 | 9/2009 | Li et al. |
| 2009/0242282 A1 | 10/2009 | Kim et al. |
| 2009/0243817 A1 | 10/2009 | Son |
| 2009/0243998 A1 | 10/2009 | Wang |
| 2009/0256807 A1 | 10/2009 | Nurmi |
| 2009/0256817 A1 | 10/2009 | Perlin et al. |
| 2009/0282930 A1 | 11/2009 | Cheng et al. |
| 2009/0303400 A1 | 12/2009 | Hou et al. |
| 2009/0309852 A1 | 12/2009 | Lin et al. |
| 2009/0314551 A1 | 12/2009 | Nakajima |
| 2010/0013785 A1 | 1/2010 | Murai et al. |
| 2010/0020030 A1 | 1/2010 | Kim et al. |
| 2010/0020039 A1 | 1/2010 | Ricks et al. |
| 2010/0039396 A1 | 2/2010 | Ho et al. |
| 2010/0053087 A1 | 3/2010 | Dai et al. |
| 2010/0053116 A1 | 3/2010 | Daverman et al. |
| 2010/0066686 A1 | 3/2010 | Joguet et al. |
| 2010/0066697 A1 | 3/2010 | Jacomet et al. |
| 2010/0079391 A1 | 4/2010 | Joung |
| 2010/0079395 A1 | 4/2010 | Kim et al. |
| 2010/0079398 A1 | 4/2010 | Shen et al. |
| 2010/0097347 A1 | 4/2010 | Lin |
| 2010/0102403 A1 | 4/2010 | Celik-Butler et al. |
| 2010/0117978 A1 | 5/2010 | Shirado |
| 2010/0123671 A1 | 5/2010 | Lee |
| 2010/0123686 A1 | 5/2010 | Klinghult et al. |
| 2010/0127140 A1 | 5/2010 | Smith |
| 2010/0128002 A1 | 5/2010 | Stacy et al. |

(56) References Cited

U.S. PATENT DOCUMENTS

| | | |
|---|---|---|
| 2010/0153891 A1 | 6/2010 | Vaananen et al. |
| 2010/0164959 A1 | 7/2010 | Brown et al. |
| 2010/0220065 A1 | 9/2010 | Ma |
| 2010/0224004 A1 | 9/2010 | Suminto et al. |
| 2010/0271325 A1 | 10/2010 | Conte et al. |
| 2010/0289807 A1 | 11/2010 | Yu et al. |
| 2010/0295807 A1 | 11/2010 | Xie et al. |
| 2010/0308844 A1 | 12/2010 | Day et al. |
| 2010/0309714 A1 | 12/2010 | Meade |
| 2010/0315373 A1 | 12/2010 | Steinhauser et al. |
| 2010/0321310 A1 | 12/2010 | Kim et al. |
| 2010/0321319 A1 | 12/2010 | Hefti |
| 2010/0323467 A1 | 12/2010 | Vaganov et al. |
| 2010/0328229 A1 | 12/2010 | Weber et al. |
| 2010/0328230 A1 | 12/2010 | Faubert et al. |
| 2011/0001723 A1 | 1/2011 | Fan |
| 2011/0006980 A1 | 1/2011 | Taniguchi et al. |
| 2011/0007008 A1 | 1/2011 | Algreatly |
| 2011/0012848 A1 | 1/2011 | Li et al. |
| 2011/0018820 A1 | 1/2011 | Huitema et al. |
| 2011/0032211 A1 | 2/2011 | Christofferson |
| 2011/0039602 A1 | 2/2011 | McNamara et al. |
| 2011/0050628 A1 | 3/2011 | Homma et al. |
| 2011/0050630 A1 | 3/2011 | Ikeda |
| 2011/0057899 A1 | 3/2011 | Sleeman et al. |
| 2011/0063248 A1 | 3/2011 | Yoon |
| 2011/0113881 A1 | 5/2011 | Suzuki |
| 2011/0128250 A1 | 6/2011 | Murphy et al. |
| 2011/0141052 A1 | 6/2011 | Bernstein et al. |
| 2011/0141053 A1 | 6/2011 | Bulea et al. |
| 2011/0187674 A1 | 8/2011 | Baker et al. |
| 2011/0209555 A1 | 9/2011 | Ahles et al. |
| 2011/0227836 A1 | 9/2011 | Li et al. |
| 2011/0242014 A1 | 10/2011 | Tsai et al. |
| 2011/0267181 A1 | 11/2011 | Kildal |
| 2011/0267294 A1 | 11/2011 | Kildal |
| 2011/0273396 A1 | 11/2011 | Chung |
| 2011/0291951 A1 | 12/2011 | Tong |
| 2011/0298705 A1 | 12/2011 | Vaganov |
| 2011/0308324 A1 | 12/2011 | Gamage et al. |
| 2012/0025337 A1 | 2/2012 | Leclair et al. |
| 2012/0032907 A1 | 2/2012 | Koizumi et al. |
| 2012/0032915 A1 | 2/2012 | Wittorf |
| 2012/0038579 A1 | 2/2012 | Sasaki |
| 2012/0044169 A1 | 2/2012 | Enami |
| 2012/0044172 A1 | 2/2012 | Ohki et al. |
| 2012/0050159 A1 | 3/2012 | Yu et al. |
| 2012/0050208 A1 | 3/2012 | Dietz |
| 2012/0056837 A1 | 3/2012 | Park et al. |
| 2012/0060605 A1 | 3/2012 | Wu et al. |
| 2012/0061823 A1 | 3/2012 | Wu et al. |
| 2012/0062603 A1 | 3/2012 | Mizunuma et al. |
| 2012/0068946 A1 | 3/2012 | Tang et al. |
| 2012/0068969 A1 | 3/2012 | Bogana et al. |
| 2012/0081327 A1 | 4/2012 | Heubel et al. |
| 2012/0086659 A1 | 4/2012 | Perlin et al. |
| 2012/0092250 A1 | 4/2012 | Hadas et al. |
| 2012/0092279 A1 | 4/2012 | Martin |
| 2012/0092294 A1 | 4/2012 | Ganapathi et al. |
| 2012/0092299 A1 | 4/2012 | Harada et al. |
| 2012/0092324 A1 | 4/2012 | Buchan et al. |
| 2012/0105358 A1 | 5/2012 | Momeyer et al. |
| 2012/0105367 A1 | 5/2012 | Son et al. |
| 2012/0113061 A1 | 5/2012 | Ikeda |
| 2012/0127088 A1 | 5/2012 | Pance et al. |
| 2012/0127107 A1 | 5/2012 | Miyashita et al. |
| 2012/0139864 A1 | 6/2012 | Sleeman et al. |
| 2012/0144921 A1 | 6/2012 | Bradley et al. |
| 2012/0146945 A1 | 6/2012 | Miyazawa et al. |
| 2012/0146946 A1 | 6/2012 | Wang et al. |
| 2012/0147052 A1 | 6/2012 | Homma et al. |
| 2012/0154315 A1 | 6/2012 | Bradley et al. |
| 2012/0154316 A1 | 6/2012 | Kono |
| 2012/0154317 A1 | 6/2012 | Aono |
| 2012/0154318 A1 | 6/2012 | Aono |
| 2012/0154328 A1 | 6/2012 | Kono |
| 2012/0154329 A1 | 6/2012 | Shinozaki |
| 2012/0154330 A1 | 6/2012 | Shimizu |
| 2012/0162122 A1 | 6/2012 | Geaghan |
| 2012/0169609 A1 | 7/2012 | Britton |
| 2012/0169617 A1 | 7/2012 | Maenpaa |
| 2012/0169635 A1 | 7/2012 | Liu |
| 2012/0169636 A1 | 7/2012 | Liu |
| 2012/0180575 A1 | 7/2012 | Sakano et al. |
| 2012/0188181 A1 | 7/2012 | Ha et al. |
| 2012/0194460 A1 | 8/2012 | Kuwabara et al. |
| 2012/0194466 A1 | 8/2012 | Posamentier |
| 2012/0200526 A1 | 8/2012 | Lackey |
| 2012/0204653 A1 | 8/2012 | August et al. |
| 2012/0205165 A1 | 8/2012 | Strittmatter et al. |
| 2012/0218212 A1 | 8/2012 | Yu et al. |
| 2012/0234112 A1 | 9/2012 | Umetsu et al. |
| 2012/0256237 A1 | 10/2012 | Lakamraju et al. |
| 2012/0286379 A1 | 11/2012 | Inoue |
| 2012/0319987 A1 | 12/2012 | Woo |
| 2012/0327025 A1 | 12/2012 | Huska et al. |
| 2013/0008263 A1 | 1/2013 | Kabasawa et al. |
| 2013/0038541 A1 | 2/2013 | Bakker |
| 2013/0093685 A1 | 4/2013 | Kalu et al. |
| 2013/0096849 A1 | 4/2013 | Campbell et al. |
| 2013/0140944 A1 | 6/2013 | Chen et al. |
| 2013/0187201 A1 | 7/2013 | Elian et al. |
| 2013/0239700 A1 | 9/2013 | Benfield et al. |
| 2013/0255393 A1 | 10/2013 | Fukuzawa et al. |
| 2013/0283922 A1 | 10/2013 | Qualtieri et al. |
| 2013/0341741 A1 | 12/2013 | Brosh |
| 2013/0341742 A1 | 12/2013 | Brosh |
| 2014/0007705 A1 | 1/2014 | Campbell et al. |
| 2014/0028575 A1 | 1/2014 | Parivar et al. |
| 2014/0055407 A1 | 2/2014 | Lee et al. |
| 2014/0090488 A1 | 4/2014 | Taylor et al. |
| 2014/0109693 A1 | 4/2014 | Sakai |
| 2014/0230563 A1 | 8/2014 | Huang |
| 2014/0260678 A1 | 9/2014 | Jentoft et al. |
| 2014/0283604 A1 | 9/2014 | Najafi et al. |
| 2014/0367811 A1 | 12/2014 | Nakagawa et al. |
| 2015/0110295 A1 | 4/2015 | Jenkner et al. |
| 2015/0226618 A1 | 8/2015 | Shih |
| 2015/0241465 A1 | 8/2015 | Konishi |
| 2015/0362389 A1 | 12/2015 | Yanev et al. |
| 2016/0069927 A1 | 3/2016 | Hamamura |
| 2016/0103545 A1 | 4/2016 | Filiz et al. |
| 2016/0223579 A1 | 8/2016 | Froemel et al. |
| 2016/0245667 A1 | 8/2016 | Najafi et al. |
| 2016/0332866 A1 | 11/2016 | Brosh et al. |
| 2016/0354589 A1 | 12/2016 | Kobayashi et al. |
| 2016/0363490 A1 | 12/2016 | Campbell et al. |
| 2017/0103246 A1 | 4/2017 | Pi et al. |
| 2017/0205303 A1 | 7/2017 | Sanden et al. |
| 2017/0233245 A1 | 8/2017 | Duqi et al. |
| 2017/0234744 A1 | 8/2017 | Tung et al. |
| 2018/0058914 A1 | 3/2018 | Iesato |
| 2018/0058955 A1 | 3/2018 | Wade et al. |
| 2019/0330053 A1 | 10/2019 | Tseng et al. |
| 2019/0383675 A1 | 12/2019 | Tsai et al. |
| 2020/0149983 A1 | 5/2020 | Tsai et al. |
| 2020/0234023 A1 | 7/2020 | Tsai et al. |
| 2020/0309615 A1 | 10/2020 | Tsai et al. |
| 2020/0378845 A1 | 12/2020 | Bergemont et al. |
| 2021/0190608 A1 | 6/2021 | Tsai et al. |
| 2022/0228971 A1* | 7/2022 | Yoshikawa ............... C08J 5/18 |

FOREIGN PATENT DOCUMENTS

| | | |
|---|---|---|
| CN | 101801837 A | 8/2010 |
| CN | 201653605 U | 11/2010 |
| CN | 101929898 A | 12/2010 |
| CN | 102062662 A | 5/2011 |
| CN | 102853950 A | 1/2013 |
| CN | 102998037 A | 3/2013 |
| CN | 103308239 A | 9/2013 |
| CN | 104535229 A | 4/2015 |
| CN | 104581605 A | 4/2015 |
| CN | 104919293 A | 9/2015 |

(56) References Cited

FOREIGN PATENT DOCUMENTS

| | | | |
|---|---|---|---|
| CN | 105934661 A | 9/2016 |
| DE | 102010012441 A1 | 9/2011 |
| JP | 2004156937 A | 6/2004 |
| JP | 2010147268 A | 7/2010 |
| JP | 2012037528 B2 | 2/2012 |
| KR | 20200106745 A | * | 9/2020 |
| WO | 9310430 A1 | 5/1993 |
| WO | 2004113859 A1 | 12/2004 |
| WO | 2007139695 A2 | 12/2007 |
| WO | 2010046233 A1 | 4/2010 |
| WO | 2011065250 A1 | 6/2011 |
| WO | 2013067548 A1 | 5/2013 |
| WO | 2015039811 A1 | 3/2015 |
| WO | 2015106246 A1 | 7/2015 |
| WO | 2018148503 A1 | 8/2018 |
| WO | 2018148510 A1 | 8/2018 |
| WO | 2019023552 A1 | 1/2019 |
| WO | 2019079420 A1 | 4/2019 |
| WO | 2020237039 A1 | 11/2020 |

OTHER PUBLICATIONS

Applicant-Initiated Interview Summary for U.S. Appl. No. 16/485,026, dated Aug. 25, 2021, 2 pages.
Notice of Allowance for U.S. Appl. No. 16/485,026, dated Sep. 30, 2021, 8 pages.
Non-Final Office Action for U.S. Appl. No. 16/632,795, dated Feb. 18, 2021, 10 pages.
Notice of Allowance for U.S. Appl. No. 16/632,795, dated Sep. 3, 2021, 7 pages.
Non-Final Office Action for U.S. Appl. No. 16/634,469, dated May 27, 2021, 13 pages.
Notice of Allowance for U.S. Appl. No. 16/634,469, dated Sep. 30, 2021, 8 pages.
Non-Final Office Action for U.S. Appl. No. 16/757,225, dated Oct. 5, 2021, 14 pages.
Notice of Allowance for U.S. Appl. No. 16/757,225, dated May 10, 2022, 9 pages.
Non-Final Office Action for U.S. Appl. No. 16/764,992, dated Jun. 24, 2021, 15 pages.
Final Office Action for U.S. Appl. No. 16/764,992, dated Jan. 19, 2022, 15 pages.
Advisory Action, Examiner-Initiated Interview Summary, and AFCP 2.0 Decision for U.S. Appl. No. 16/764,992, dated Apr. 20, 2022, 5 pages.
International Search Report and Written Opinion for International Patent Application No. PCT/US2018/056245, dated Dec. 27, 2018, 8 pages.
Office Action for Chinese Patent Application No. 2018800601531, dated Apr. 6, 2021, 16 pages.
Communication Pursuant to Rule 164(1) EPC issued for European Application No. 18834426.1, dated Mar. 10, 2021, 16 pages.
Extended European Search Report issued for European Application No. 18834426.1, dated Jun. 10, 2021, 13 pages.
International Search Report and Written Opinion for International Patent Application No. PCT/US2018/042883, dated Dec. 6, 2018, 9 pages.
International Search Report and Written Opinion for International Patent Application No. PCT/US2018/044049, dated Oct. 18, 2018, 11 pages.
Non-Final Office Action for U.S. Appl. No. 16/764,992, dated Jun. 14, 2022, 14 pages.
International Search Report and Written Opinion for International Patent Application No. PCT/US2018/061509, dated Jan. 29, 2019, 8 pages.

Virginia Semiconductors, "The General Properties of Si, Ge, SiGe2, SiO2, and Si3N4," Jun. 2002, www.virginiasemi.com/pdf/generalpropertiesSi62002.pdf, Virginia Semiconductor Inc., 5 pages.
Non-Final Office Action for U.S. Appl. No. 17/676,477, dated Nov. 23, 2022, 12 pages.
Notice of Allowance for U.S. Appl. No. 17/51,715, dated Oct. 26, 2022, 13 pages.
Notice of Allowance for U.S. Appl. No. 17/591,706, dated Nov. 10, 2022, 12 pages.
Notice of Allowance for U.S. Appl. No. 16/757,225, dated Oct. 6, 2022, 9 pages.
Mei, et al., "Design and Fabrication of an Integrated Three-Dimensional Tactile Sensor for Space Robotic Applications," International Conference on Micro Electro Mechanical Systems, Jan. 1999, Orlando, Florida, IEEE, pp. 112-117.
Nesterov, et al., "Modelling and investigation of the silicon twin design 3D micro probe," Journal of Micromechanics and Microengineering, vol. 15, 2005, IOP Publishing Ltd, pp. 514-520.
First Office Action for Chinese Patent Application No. 201880023913.1, dated Dec. 25, 2020, 22 pages.
Second Office Action for Chinese Patent Application No. 201880023913.1, dated Sep. 10, 2021, 13 pages.
Third Office Action for Chinese Patent Application No. 201880023913.1, dated Apr. 6, 2022, 13 pages.
Extended European Search Report for European Patent Application No. 18751209.0, dated Oct. 22, 2020, 7 pages.
International Search Report and Written Opinion for International Patent Application No. PCT/US2018/017564, dated Jun. 15, 2018, 10 pages.
Non-Final Office Action for U.S. Appl. No. 16/485,016, dated Jun. 12, 2020, 13 pages.
Final Office Action for U.S. Appl. No. 16/485,016, dated Mar. 24, 2021, 10 pages.
Notice of Allowance for U.S. Appl. No. 16/485,016, dated Jul. 9, 2021, 8 pages.
International Search Report and Written Opinion for International Patent Application No. PCT/US2018/017572, dated May 3, 2018, 8 pages.
Final Office Action for U.S. Appl. No. 16/764,992, dated Jan. 6, 2023, 13 pages.
Decision of Rejection for Chinese Patent Application No. 201880023913.1, dated Oct. 27, 2022, 9 pages.
Examination Report for European Patent Application No. 18751209.0, dated Dec. 19, 2022, 5 pages.
Non-Final Office Action for U.S. Appl. No. 17/676,477, dated May 9, 2023, 11 pages.
Notice of Allowance for U.S. Appl. No. 18/081,255, dated Apr. 27, 2023, 14 pages.
Advisory Action for U.S. Appl. No. 16/764,992, dated Apr. 17, 2023, 3 pages.
Non-Final Office Action for U.S. Appl. No. 16/764,992, dated May 31, 2023, 6 pages.
Non-Final Office Action for U.S. Appl. No. 18/117,156, dated Jul. 19, 2023, 13 pages.
Notice of Allowance for U.S. Appl. No. 16/764,992, dated Sep. 8, 2023, 9 pages.
Corrected Notice of Allowability for U.S. Appl. No. 16/764,992, dated Sep. 20, 2023, 6 pages.
Notice of Allowance for U.S. Appl. No. 17/676,477, dated Nov. 8, 2023, 8 pages.
Notice of Allowance for U.S. Appl. No. 18/117,156, dated Nov. 8, 2023, 8 pages.
Examination Report for European Patent Application No. 18834426.1, dated Sep. 6, 2023, 8 pages.

* cited by examiner

TEMPERATURE COEFFICIENT OF OFFSET COMPENSATION FOR FORCE SENSOR AND STRAIN GAUGE

CROSS-REFERENCE TO RELATED APPLICATIONS

This application is a continuation of U.S. patent application Ser. No. 16/757,225, filed on Apr. 17, 2020, which is a 371 of international application No. PCT/US18/56245, filed on Oct. 17, 2018, which claims the benefit of U.S. provisional patent application No. 62/573,271, filed on Oct. 17, 2017, and entitled "TCO COMPENSATION FOR FORCE SENSOR AND STRAIN GAUGE," the disclosures of which are expressly incorporated herein by reference in their entireties.

FIELD OF TECHNOLOGY

The present disclosure relates to temperature coefficient of offset (TCO) compensation for force sensors and strain gauges in the chip scale package format.

BACKGROUND

A MEMS force sensor or strain gauge has intrinsic offset as a result of the manufacturing and assembly processes. Additionally, the offset of the sensor can change in relation to temperature due to the thermal coefficient of expansion (TCE) mismatch between the package substrate, substrate of the sensor, solder bumps, and/or inter metal dielectric layers of the sensor chip. The slope of the offset versus temperature is defined as the temperature coefficient of offset (TCO). The offset under extreme temperatures can put subsequent amplifier and/or analog-to-digital convertor out of normal operation range and thus render the entire sensing system unusable.

In some conventional systems, the solution to TCO problems involve the electrical sensing circuitry, which broadens the operation range of the MEMS force sensor.

SUMMARY

According to the present disclosure, a TCO compensation layer is provided on the MEMS force sensor to minimize the offset drift over temperature. By choosing the right combination of Young's modulus, thickness, and TCE, the TCO of the MEMS force sensor can be reduced to zero.

An example microelectromechanical ("MEMS") force sensor for providing temperature coefficient of offset (TCO) compensation is described herein. The force sensor can include a sensor substrate configured to receive an applied force, where the sensor substrate can include a top surface and a bottom surface opposite thereto. The force sensor can also include a sensing element arranged on the bottom surface of the sensor substrate, where the sensing element is configured to convert a strain on the bottom surface of the sensor substrate to an electrical signal that is proportional to the strain. The force sensor can further include a compensation layer arranged on the top surface of the sensor substrate, where the compensation layer has a thermal coefficient of expansion that is different than a thermal coefficient of expansion of the sensor substrate.

Additionally, the thermal coefficient of expansion of the compensation layer can be less than the thermal coefficient of expansion of the sensor substrate. Alternatively, the thermal coefficient of expansion of the compensation layer can be greater than the thermal coefficient of expansion of the sensor substrate.

Alternatively or additionally, the thermal coefficient of expansion of the compensation layer can be within the same order of magnitude of a thermal coefficient of expansion of a package substrate.

Alternatively or additionally, at least one of a thickness of the compensation layer, a stiffness of the compensation layer, and/or the thermal coefficient of expansion of the compensation layer can minimize TCO. Optionally, a combination of a thickness, a stiffness, and the thermal coefficient of expansion of the compensation layer of the compensation layer can minimize TCO. Optionally, TCO is minimized at a value of about zero.

Alternatively or additionally, the MEMS force sensor can be configured for use as strain gauge.

Alternatively or additionally, the sensing element can be a piezoresistive sensing element.

Alternatively or additionally, the sensing element can be piezoresistive and piezoelectric elements.

Alternatively or additionally, the force sensor can further include a cap substrate, where the sensor and cap substrates are bonded together forming a sealed cavity there between.

Alternatively or additionally, the force sensor can be configured for electrical and mechanical coupling to a package substrate. In some implementations, the force sensor can be electrically and mechanically coupled to the package substrate. The package substrate can be a printed circuit board (PCB), a flexible printed circuit board (FPC), or a co-fired ceramic.

Alternatively or additionally, the compensation layer can be formed of at least one of polymer, polyimide, resin, polycarbonate, acrylonitrile butadiene styrene (ABS), silicon oxide, glass, or combinations thereof.

Alternatively or additionally, the force sensor can further include a plurality of sensing elements arranged on the bottom surface of the sensor substrate.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

The components in the drawings are not necessarily to scale relative to each other. Like reference numerals designate corresponding parts throughout the several views.

As shown in FIG. 1, the MEMS force sensor is mounted on a package substrate through solder bumps.

As shown in FIG. 2, the MEMS force sensor is mounted on a package substrate through solder bumps.

As shown in FIG. 3, the MEMS force sensor is mounted on a package substrate through solder bumps.

DETAILED DESCRIPTION

The present disclosure can be understood more readily by reference to the following detailed description, examples, drawings, and their previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching. To this end, those skilled in the relevant art will recognize and appreciate that many changes can be made, while still obtaining beneficial results. It will also be apparent that some of the desired benefits can be obtained by selecting some of the features without utilizing other features. Accordingly, those who work in the art will recognize that many modifications and adaptations may be possible and can even be desirable in certain circumstances, and are contemplated by this disclosure. Thus, the following description is provided as illustrative of the principles and not in limitation thereof.

As used throughout, the singular forms "a," "an" and "the" include plural referents unless the context clearly dictates otherwise. Thus, for example, reference to "a force sensing element" can include two or more such force sensing elements unless the context indicates otherwise.

The term "comprising" and variations thereof as used herein is used synonymously with the term "including" and variations thereof and are open, non-limiting terms.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The present disclosure relates to the TCO compensation layer for MEMS force sensor and strain gauge. Three different types of MEMS force sensor's TCO can be compensated with this layer. The force sensor can also be reconfigured as strain gauge if the force is applied through the package substrate. The root cause of the TCO is illustrated and the material property and dimension effect to the TCO is also illustrated.

Figure 1:
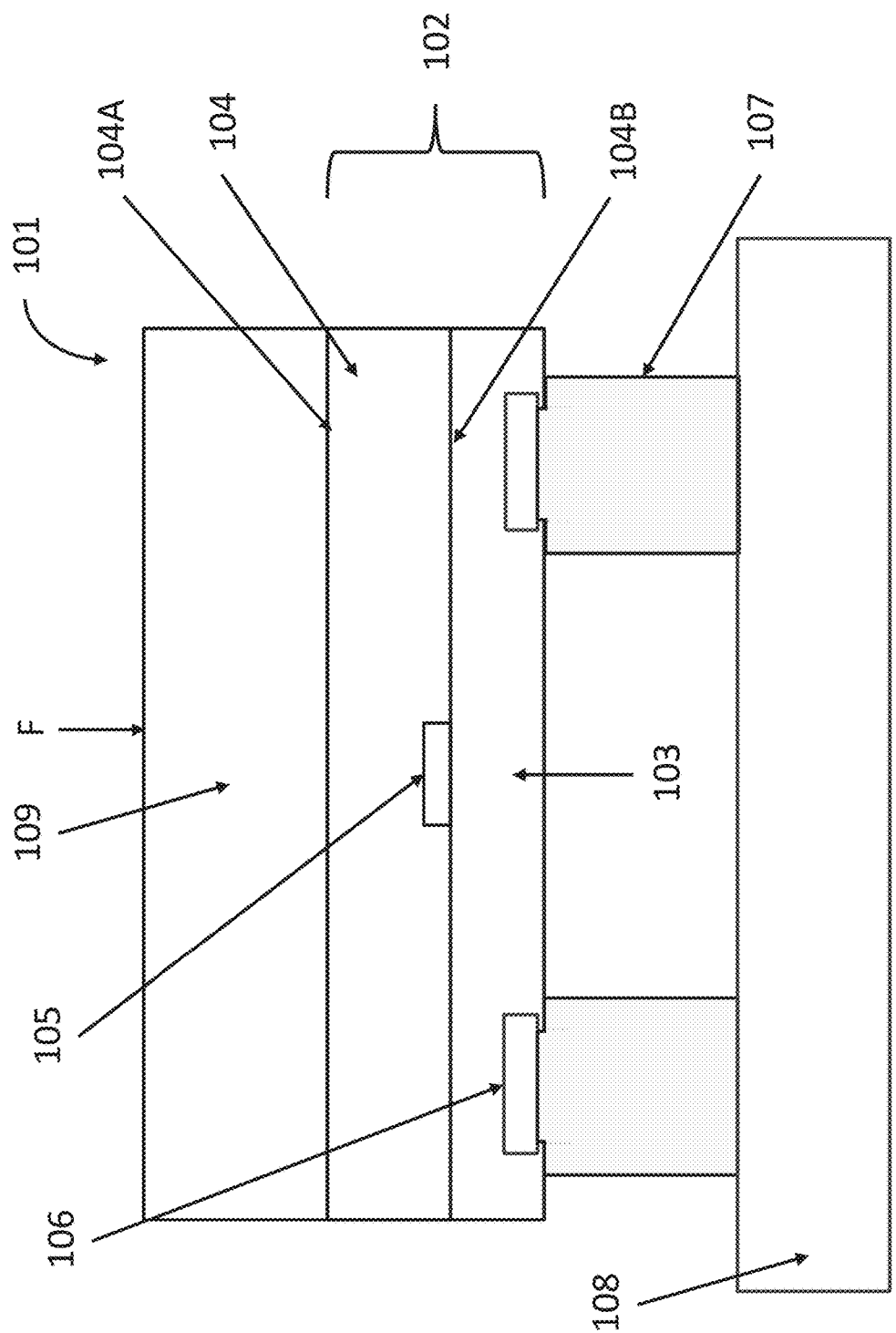
FIG. 1 illustrates a MEMS force sensor using piezoresistive sensing element(s) with the TCO compensation layer.

FIG. 1 illustrates the force sensor 102 (e.g., a MEMS force sensor) mounted on a package substrate 108. The package substrate 108 can be a printed circuit board (PCB), a flexible printed circuit board (FPC), or a co-fired ceramic. It should be understood that PCBs, FPCs, and co-fired ceramics are provided only as example package substrates. The combined force sensor and package substrate is shown by reference number 101 in FIG. 1. The force sensor 102 can include a dielectric layer 103, a sensor substrate 104, and a piezoresistive sensing element 105. The sensor substrate, which can also be referred to as a sensor die, can be made of a semiconductor material such as silicon or gallium arsenide, for example. As shown in FIG. 1, the sensor substrate 104 has a top surface 104A and a bottom surface 104B, which is opposite to the top surface 104A. The piezoresistive sensing element 105 is arranged on the bottom surface 104B. Optionally, in some implementations, a plurality of piezoresistive sensing elements 105 can be arranged on the sensor substrate 104. This disclosure contemplates that the piezoresistive sensing element(s) 105 can be diffused, deposited, or implanted on the bottom surface 104B. The dielectric layer 103 can then be arranged (e.g., deposited) over the bottom surface 104B to electrically isolate the piezoresistive sensing element(s) 105.

The piezoresistive sensing element 105 can change an electrical characteristic (e.g., resistance) in response to deflection of the sensor substrate 104. For example, the piezoresistive sensing element 105 can sense strain on the bottom surface 104A of the sensor substrate 104. The change in electrical characteristic can be measured as an analog electrical signal. In one implementation, the piezoresistive sensing element 105 can optionally be a piezoresistive transducer. For example, as strain is induced in the sensor substrate 104 proportional to a force "F" applied to the force sensor 102, a localized strain is produced on the piezoresistive transducer such that the piezoresistive transducer experiences compression or tension, depending on its specific orientation. As the piezoresistive transducer compresses and tenses, its resistivity changes in opposite fashion. Accordingly, a Wheatstone bridge circuit including a plurality (e.g., four) piezoresistive transducers (e.g., two of each orientation relative to strain) becomes unbalanced and produces a differential voltage (also sometimes referred to herein as an "analog electrical signal") across the positive signal terminal and the negative signal terminal. This differential voltage is directly proportional to the applied force "F" on the force sensor 102. This differential voltage can be received at and processed by digital circuitry. For example, digital circuitry can be configured to, among other functions, convert the analog electrical signal to a digital electrical signal. Although piezoresistive transducers are provided as an example sensing element, this disclosure contemplates that the sensing element(s) can be any sensor element configured to change at least one electrical characteristic (e.g., resistance, charge, capacitance, etc.) based on an amount or magnitude of an applied force and can output a signal proportional to the amount or magnitude of the applied force. Other types of sensing elements include, but are not limited to, piezoelectric or capacitive sensors. Additionally, application of force "F" to the force sensor 102 is provided only as an example. This disclosure contemplates that force can be applied to other sides of the force sensor including, but not limited to, via the package substrate 108, which is arranged below the force sensor. Such application of force can produce a localized strain in the sensors. Example MEMS force sensors using piezoresistive sensing elements are described in U.S. Pat. No. 9,487,388, issued Nov. 8, 2016 and entitled "Ruggedized MEMS Force Die;" U.S. Pat. No. 9,493,342, issued Nov. 15, 2016 and entitled "Wafer Level MEMS Force Dies;" U.S. Pat. No. 9,902,611, issued Feb. 27, 2018 and entitled "Miniaturized and ruggedized wafer level mems force sensors;" and U.S. Patent Application Publication No. 2016/0363490 to Campbell et al., filed Jun. 10, 2016 and entitled "Ruggedized wafer level mems force sensor with a tolerance trench," the disclosures of which are incorporated by reference in their entireties.

As shown in FIG. 1, the force sensor 102 can also include metal layer(s) 106. The metal layers 106 can be made of any suitable conductive material, including but not limited to, aluminum, copper, or gold, for example. The metal layers 106 can provide electrical connection between the force sensor 102 and the package substrate 108. For example, the force sensor 102 can be electrically and mechanically coupled to the package substrate 108 through solder bumps 107 provided on the bottom surface of the force sensor 102. The solder bumps 107 are connected to the force sensor 102 at the metal layers 106, which provide the electrical connection to the force sensor 102 such that an electrical signal can be transferred from the force sensor 102 to the package substrate 108. It should be understood that solder bumps 107 are provided in FIG. 1 only as an example mechanism for mechanically and electrically connecting the force sensor 102 to the package substrate 108.

The force sensor 102 can also include a compensation layer 109 (also sometimes referred to herein as "TCO compensation layer"). The compensation layer 109 can be formed from materials including, but not limited to, polymer, polyimide, resin, polycarbonate, acrylonitrile butadiene styrene (ABS), silicon oxide, glass, or combinations thereof. As shown in FIG. 1, the TCO compensation layer 109 can be arranged on the top surface 104A of the sensor substrate 104. This disclosure contemplates that the force "F" can be applied to the force sensor 102 via the TCO compensation layer 109, e.g., the TCO compensation layer 109 can be disposed on the top surface of the force sensor. As described herein, the compensation layer 109 has a thermal coefficient of expansion (TCE) that is different than a TCE of the sensor substrate 104. In some implementations, the TCE of the compensation layer 109 can be less than the TCE of the sensor substrate 104. In other implementations, the TCE of the compensation layer 109 can be greater than the TCE of the sensor substrate 104. This disclosure contemplates that the thickness, the stiffness, the TCE, and/or the combination of thickness, stiffness, and TCE of the compensation layer 109 can be selected to reduce TCO. Alternatively or additionally, this disclosure contemplates that the thickness, the stiffness, the TCE, and/or the combination of thickness, stiffness, and TCE of the compensation layer 109 can be selected to minimize TCO. Optionally, the above characteristics of the compensation layer 109 can be selected to make TCO zero. Optionally, the above characteristics of the compensation layer 109 can be selected to make TCO a minimum but non-zero value based on design limitations (e.g., commercial, engineering, etc.). In other words, it should be understood that it may not be desirable or possible to reduce TCO to zero for every force sensor design. The effect of compensation layer stiffness on TCO is described below with regard to FIG. 5. The effect of compensation layer thickness on TCO is described below with regard to FIG. 6. Alternatively, as described above, the force "F" can be applied to the package substrate 108. In this implementation, the force "F" can be applied via a TCO compensation layer and the TCO compensation layer can be designed as described above.

Figure 2:
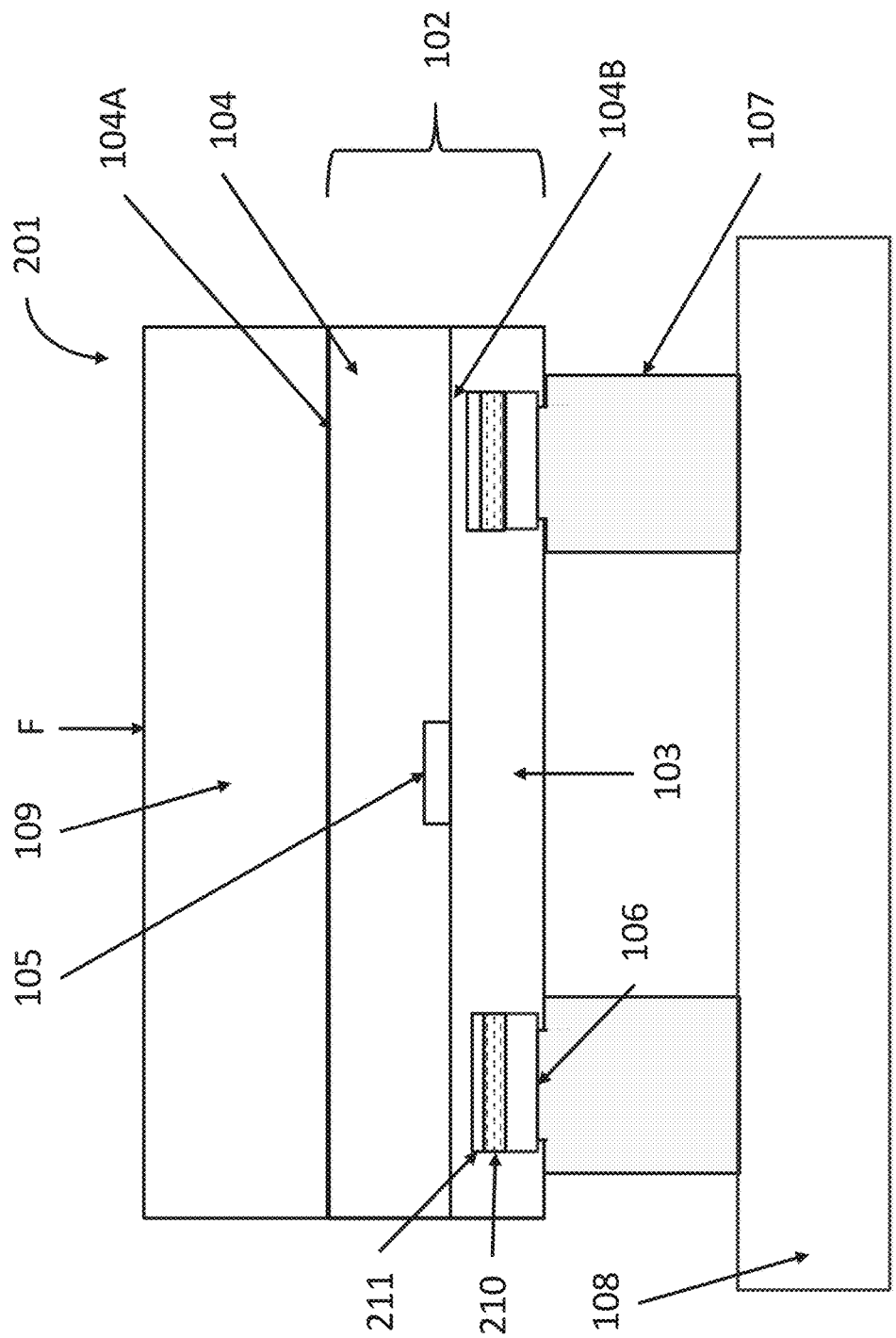
FIG. 2 illustrates a MEMS force sensor using both piezoresistive and piezoelectric sensing element(s) with the TCO compensation layer.

FIG. 2 illustrates the force sensor 102 (e.g., a MEMS force sensor) mounted on a package substrate 108. The package substrate 108 can be a printed circuit board (PCB), a flexible printed circuit board (FPC), or a co-fired ceramic. It should be understood that PCBs, FPCs, and co-fired ceramics are provided only as example package substrates. The combined force sensor and package substrate is shown by reference number 201 in FIG. 2. The force sensor 102 can include a dielectric layer 103, a sensor substrate 104, and a piezoresistive sensing element 105. The sensor substrate, which can also be referred to as a sensor die, can be made of a semiconductor material such as silicon or gallium arsenide, for example. As shown in FIG. 2, the sensor substrate 104 has a top surface 104A and a bottom surface 104B, which is opposite to the top surface 104A. The piezoresistive sensing element 105 is arranged on the bottom surface 104B. Optionally, in some implementations, a plurality of piezoresistive sensing elements 105 can be arranged on the sensor substrate 104. This disclosure contemplates that the piezoresistive sensing element(s) 105 can be diffused, deposited, or implanted on the bottom surface 104B. The dielectric layer 103 can then be arranged (e.g., deposited) over the bottom surface 104B to electrically isolate the piezoresistive sensing element(s) 105. Piezoresistive sensing elements are described above with regard to FIG. 1 and are therefore not described in further detail below.

As shown in FIG. 2, the force sensor 102 can include a piezoelectric sensor in addition to the piezoresistive sensing element(s) 105. This disclosure contemplates that the force sensor 102 can include a plurality of piezoelectric sensors. A piezoelectric sensor can include a piezoelectric sensing element 210 arranged between opposing electrodes. In FIG. 2, the piezoelectric sensing element 210 is sandwiched between piezoelectric electrode 211 and metal layer 106 (e.g., the opposing electrodes). Piezoresistive and piezoelectric sensing elements can be used together in MEMS force sensors. For example, piezoresistive sensing elements are useful for sensing static forces applied to the force sensor 102, while piezoelectric sensing elements are useful for sensing dynamic forces acting on the force sensor 102. Thus, both piezoresistive and piezoelectric sensors can be used in conjunction to detect both static and dynamic forces. As described above, the piezoelectric sensing element 210 is located between piezoelectric electrode 211 and metal layer 106. The piezoelectric sensing elements 105 can be configured to convert a change in strain to an analog electrical signal that is proportional to the change strain on the bottom surface 104B. The piezoelectric sensing elements 210 sense dynamic forces applied to the force sensor 102. Additionally, the electrical signals detected by the piezoresistive and piezoelectric sensing elements can be routed to digital circuitry. For example, the digital circuitry can be configured to, among other functions, convert the analog electrical signals to a digital electrical output signal. The use of both piezoresistive and piezoelectric sensing elements in a MEMS force sensor is described in detail in WO2018/148510, published Aug. 16, 2018 and entitled "INTEGRATED PIEZORESISTIVE AND PIEZOELECTRIC FUSION FORCE SENSOR," the disclosure of which is expressly incorporated herein by reference in its entirety.

As shown in FIG. 2, the force sensor 102 can also include metal layer(s) 106. The metal layers 106 can be made of any suitable conductive material, including but not limited to, aluminum, copper, or gold, for example. The metal layers 106 can provide electrical connection between the force sensor 102 and the package substrate 108. For example, the force sensor 102 can be electrically and mechanically coupled to the package substrate 108 through solder bumps 107 provided on the bottom surface of the force sensor 102. The solder bumps 107 are connected to the force sensor 102 at the metal layer 106, which provides the electrical connection to the force sensor 102 such that an electrical signals can be transferred from the force sensor 102 to the package substrate 108. It should be understood that solder bumps 107 are provided in FIG. 2 only as an example mechanism for mechanically and electrically connecting the force sensor 102 to the package substrate 108.

The force sensor 102 can also include a compensation layer 109 (also sometimes referred to herein as "TCO compensation layer"). The compensation layer 109 can be formed from materials including, but not limited to, polymer, polyimide, resin, polycarbonate, acrylonitrile butadiene styrene (ABS), silicon oxide, glass, or combinations thereof. As shown in FIG. 2, the TCO compensation layer 109 can be arranged on the top surface 104A of the sensor substrate 104. This disclosure contemplates that the force "F" can be applied to the force sensor 102 via the TCO compensation layer 109, e.g., the TCO compensation layer 109 can be disposed on the top surface of the force sensor. As described herein, the compensation layer 109 has a thermal coefficient of expansion (TCE) that is different than a TCE of the sensor substrate 104. In some implementations, the TCE of the compensation layer 109 can be less than the TCE of the sensor substrate 104. In other implementations, the TCE of the compensation layer 109 can be greater than the TCE of the sensor substrate 104. This disclosure contemplates that the thickness, the stiffness, the TCE, and/or the combination of thickness, stiffness, and TCE of the compensation layer 109 can be selected to reduce TCO. Alternatively or additionally, this disclosure contemplates that the thickness, the stiffness, the TCE, and/or the combination of thickness, stiffness, and TCE of the compensation layer 109 can be selected to minimize TCO. Optionally, the above characteristics of the compensation layer 109 can be selected to make TCO zero. Optionally, the above characteristics of the compensation layer 109 can be selected to make TCO a minimum but non-zero value based on the design limitations (e.g., commercial, engineering, etc.). In other words, it should be understood that it may not be desirable or possible to reduce TCO to zero for every force sensor design. The effect of compensation layer thickness on TCO is described below with regard to FIG. 6. The effect of compensation layer stiffness on TCO is described below with regard to FIG. 5. Alternatively, as described above, the force "F" can be applied to the package substrate 108. In this implementation, the force "F" can be applied via a TCO compensation layer and the TCO compensation layer can be designed as described above.

Figure 3:
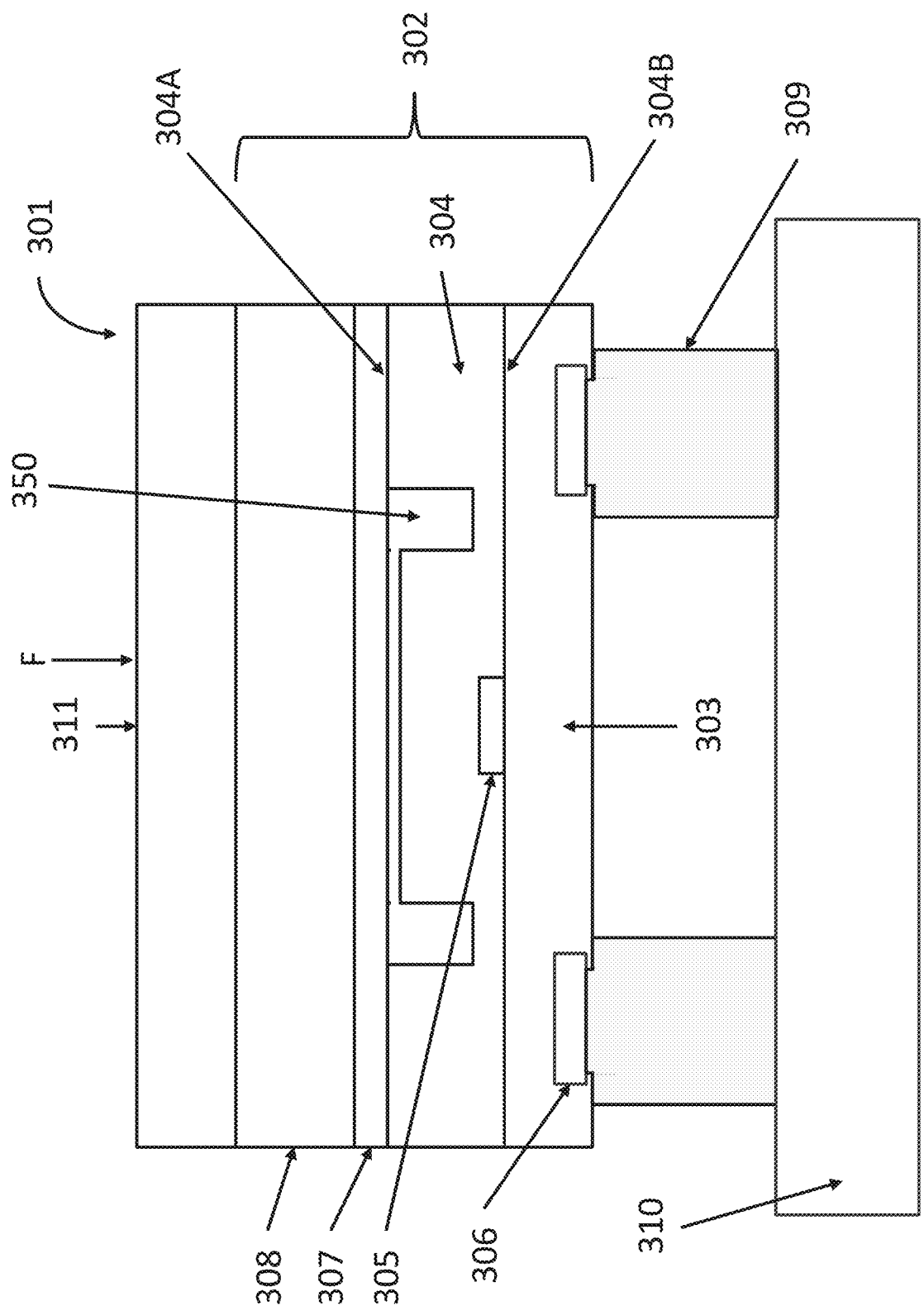
FIG. 3 illustrates a MEMS force sensor having a sealed cavity and using piezoresistive sensing element(s) with the TCO compensation layer.

FIG. 3 illustrates another force sensor 302 (e.g., a MEMS force sensor) mounted on a package substrate 310. The package substrate 310 can be a printed circuit board (PCB), a flexible printed circuit board (FPC), or a co-fired ceramic. It should be understood that PCBs, FPCs, and co-fired ceramics are provided only as example package substrates. The combined force sensor and package substrate is shown by reference number 301 in FIG. 3. The force sensor 302 can include a dielectric layer 303, a sensor substrate 304, a bond oxide layer 307, a cap substrate 308, and a piezoresistive sensing element 305. The sensor substrate, which can also be referred to as a sensor die, can be made of a semiconductor material such as silicon or gallium arsenide, for example. As shown in FIG. 3, the sensor substrate 304 has a top surface 304A and a bottom surface 304B, which is opposite to the top surface 304A. The piezoresistive sensing element 305 is arranged on the bottom surface 304B. Optionally, in some implementations, a plurality of piezoresistive sensing elements 305 can be arranged on the sensor substrate 304. This disclosure contemplates that the piezoresistive sensing element(s) 305 can be diffused, deposited, or implanted on the bottom surface 304B. The dielectric layer 303 can then be arranged (e.g., deposited) over the bottom surface 304B to electrically isolate the piezoresistive sensing element(s) 305. Piezoresistive sensing elements are described above with regard to FIG. 1 and are therefore not described in further detail below.

As described above, the force sensor 302 can include the sensor substrate 304 and the cap substrate 308. The sensor substrate 304 and the cap substrate 308 can be bonded together via the bonded oxide layer 307. It should be understood that the bonded oxide layer 307 is only provided as an example mechanism for bonding the sensor substrate 304 and the cap substrate 308. For example, this disclosure contemplates bonding the substrates using other techniques known in the art including, but not limited to, silicon fusion bonding, anodic bonding, glass frit, thermo-compression, and eutectic bonding. The cap substrate 308 can optionally be made of glass (e.g., borosilicate glass) or semiconductor (e.g., silicon). The internal surfaces between the sensor substrate 304 and the cap substrate 308 form a sealed cavity 350. The sealed cavity 350 can be formed by etching a trench from the sensor substrate 304 and then sealing a volume between the bonded sensor substrate 304 and cap substrate 308. For example, the volume is sealed between the sensor substrate 304 and the cap substrate 308 when adhered together, which results in formation of the sealed cavity 350. Example MEMS force sensors having a sealed cavity are described in U.S. Pat. No. 9,902,611, issued Feb. 27, 2018 and entitled "Miniaturized and ruggedized wafer level mems force sensors;" and U.S. Patent Application Publication No. 2016/0363490 to Campbell et al., filed Jun. 10, 2016 and entitled "Ruggedized wafer level mems force sensor with a tolerance trench," the disclosures of which are incorporated by reference in their entireties. The force sensor 302 therefore has a sealed cavity 350 that defines a volume entirely enclosed by the sensor substrate 304 and the cap substrate 308. The sealed cavity 350 can be sealed from the external environment.

As shown in FIG. 3, the force sensor 302 can also include metal layer(s) 306. The metal layers 306 can be made of any suitable conductive material, including but not limited to, aluminum, copper, or gold, for example. The metal layers 306 can provide electrical connection between the force sensor 302 and the package substrate 310. For example, the force sensor 302 can be electrically and mechanically coupled to the package substrate 310 through solder bumps 309 provided on the bottom surface of the force sensor 302. The solder bumps 309 are connected to the force sensor 302 at the metal layer 306, which provides the electrical connection to the force sensor 302 such that an electrical signal can be transferred from the force sensor 302 to the package substrate 310. It should be understood that solder bumps 309 are provided in FIG. 3 only as an example mechanism for mechanically and electrically connecting the force sensor 302 to the package substrate 310.

The force sensor 302 can also include a compensation layer 311 (also sometimes referred to herein as "TCO compensation layer"). The compensation layer 311 can be formed from materials including, but not limited to, polymer, polyimide, resin, polycarbonate, acrylonitrile butadiene styrene (ABS), silicon oxide, glass, or combinations thereof. As shown in FIG. 3, the TCO compensation layer 311 can be arranged on the top surface 304A of the sensor substrate 304. This disclosure contemplates that the force "F" can be applied to the force sensor 302 via the TCO compensation layer 311, e.g., the TCO compensation layer 311 can be disposed on the top surface of the force sensor. As described herein, the compensation layer 311 has a thermal coefficient of expansion (TCE) that is different than a TCE of the sensor substrate 304. In some implementations, the TCE of the compensation layer 311 can be less than the TCE of the sensor substrate 304. In other implementations, the TCE of the compensation layer 311 can be greater than the TCE of the sensor substrate 304. This disclosure contemplates that the thickness, the stiffness, the TCE, and/or the combination of thickness, stiffness, and TCE of the compensation layer 311 can be selected to reduce TCO. Alternatively or additionally, this disclosure contemplates that the thickness, the stiffness, the TCE, and/or the combination of thickness, stiffness, and TCE of the compensation layer 311 can be selected to minimize TCO. Optionally, the above characteristics of the compensation layer 311 can be selected to make TCO zero. Optionally, the above characteristics of the compensation layer 311 can be selected to make TCO a minimum but non-zero value based on the design limitations (e.g., commercial, engineering, etc.). In other words, it should be understood that it may not be desirable or possible to reduce TCO to zero for every force sensor design. The effect of compensation layer thickness on TCO is described below with regard to FIG. 6. The effect of compensation layer stiffness on TCO is described below with regard to FIG. 5. Alternatively, as described above, the force "F" can be applied to the package substrate 310. In this implementation, the force "F" can be applied via a TCO compensation layer and the TCO compensation layer can be designed as described above.

Figure 4:
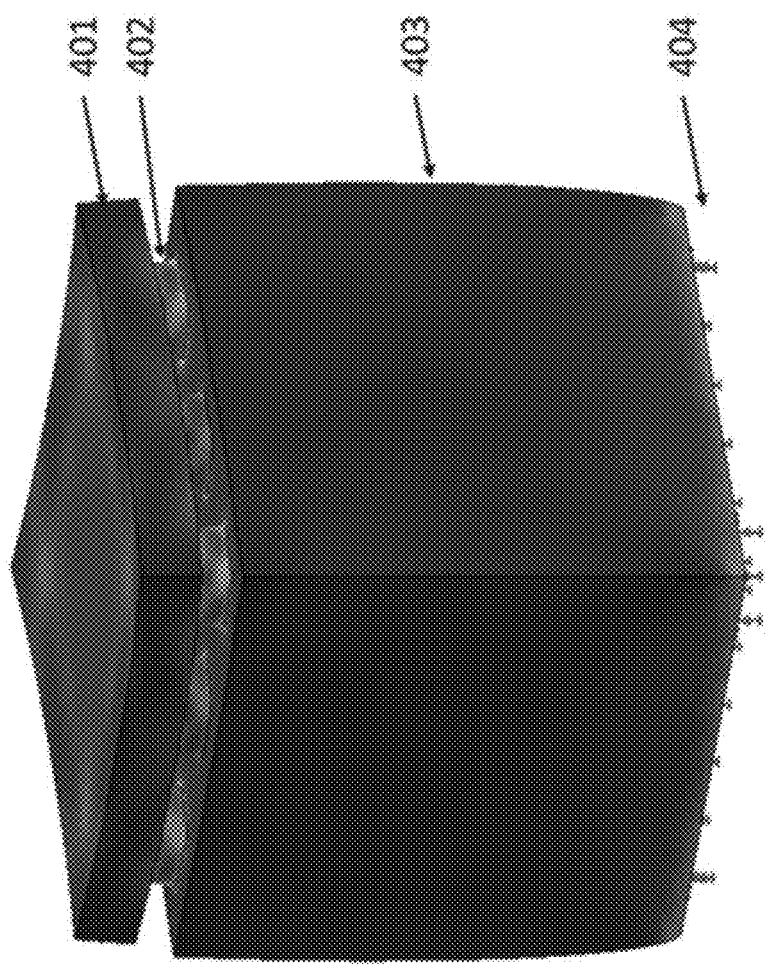
FIG. 4 illustrates an exaggerated deformation due to a temperature increase from a zero stress condition.

Referring now to FIG. 4, deformation of an example MEMS force sensor due to an increase in temperature is shown. Such deformation has been exaggerated by 5000 times to provide clear visual examination. In FIG. 4, a force sensor 401 is mounted to a package substrate 403 through solder bumps 402. It should be understood that the force sensor 401 can be similar to one of the force sensors shown in FIG. 1-3 with the exception of including a compensation layer (e.g., compensation layer 109 or 311 in FIGS. 1-3). In other words, the force sensor 401 can optionally include a sensor substrate, sensing element(s), a dielectric layer, and/or a cap substrate but does not include a TCO compensation layer. This disclosure contemplates that the bottom of the package substrate 404 is fixed for the purposes of the simulation, which mimics the actual operation conditions. In FIG. 4, a temperature raise (e.g., an increase in temperature) is applied to the model for simulation from zero stress condition for TCO simulation. As shown in FIG. 4, the package substrate 403 experiences thermal expansion as a result of the increase in temperature. Additionally, the deformation of the package substrate 403 is transferred to the force sensor 401 through the solder bumps 402. The deformation shown in FIG. 4 causes negative TCO. Although deformation causing negative TCO is shown in FIG. 4, this disclosure contemplates that deformation causing positive TCO can occur, for example, due to decreases in temperature.

Figure 5:
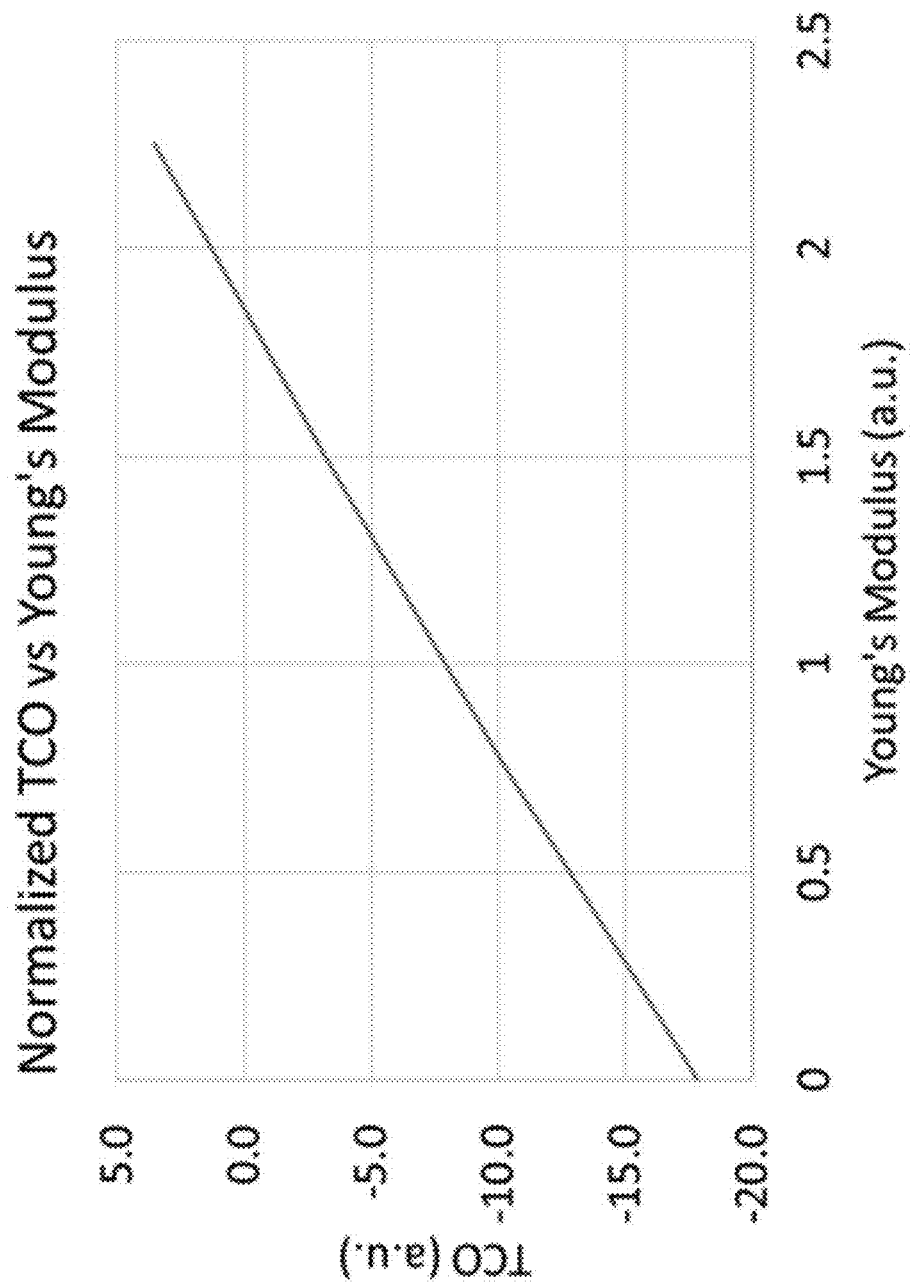
FIG. 5 illustrates normalized TCO with fixed TCO compensation layer thickness and TCE versus the Young's modulus of the TCO compensation layer.

Referring now to FIG. 5, a graph illustrating normalized TCO versus normalized Young's modulus for an example compensation layer is shown. In FIG. 5, TCO is normalized to the specific material and dimensions of an example MEMS force sensor. FIG. 5 illustrates the effect of varying the Young's modulus on TCO of the compensation layer. In the examples described herein, Young's modulus is provided as an example measure of the stiffness of the compensation layer material. Young's modulus is a known property that defines the relationship between stress and strain of a material. This disclosure contemplates that other measures of stiffness can be used. In some implementations, the TCE of the compensation layer is selected to be within the same order of magnitude of the TCE of the package substrate. In some implementations, the TCE of the compensation layer is selected to be about equal to the TCE of the package substrate. Optionally, the respective TCE of both the compensation layer and the package substrate can be larger than the TCE of silicon. As shown in FIG. 5, by increasing the Young's modulus of the compensation layer, the TCO increases linearly and proportionally to the Young's modulus of the compensation layer. Additionally, at a particular Young's modulus, the TCO crosses over from negative to positive value. In FIG. 5, this occurs where the normalized Young's modulus is about 2.0. Accordingly, by setting the Young's modulus appropriately, e.g., between about 1.5 to 2 for the example shown in FIG. 5, the TCO can be tuned to zero.

Figure 6:
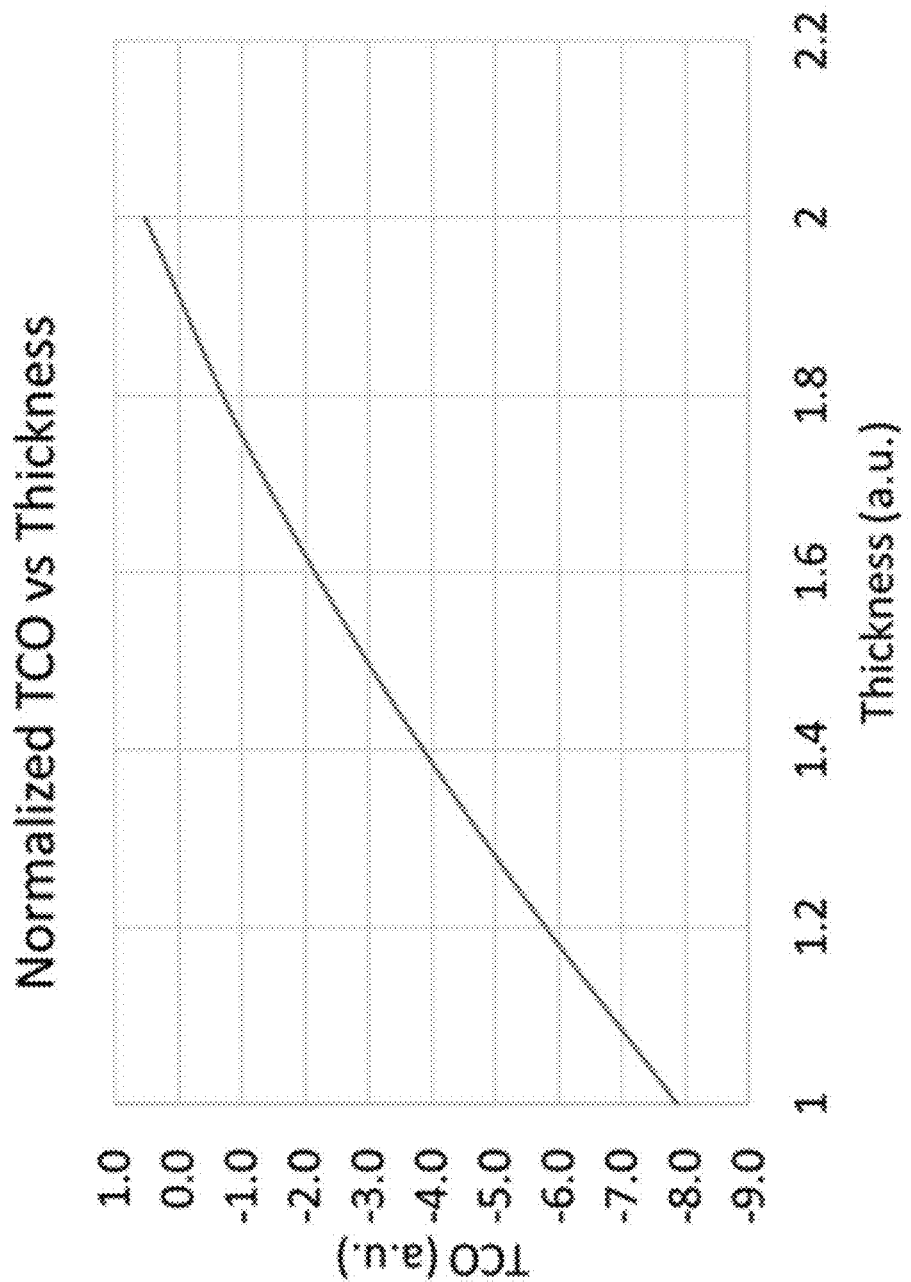
FIG. 6 illustrates normalized TCO with fixed TCO compensation layer Young's modulus and TCE versus the TCO compensation layer thickness.

In some cases, neither the Young's modulus nor the TCE of the compensation layer can be chosen without limitation. This is because both the Young's modulus and TCE are material properties, and there may be limitations (e.g., commercial, engineering, etc.) on the materials used. As described below, the thickness of the compensation layer affects the TCO. Referring now to FIG. 6, a graph illustrating normalized TCO versus thickness of an example compensation layer is shown. In the example of FIG. 6, the Young's modulus and TCE are set based on the material of the compensation layer. FIG. 6 illustrates the relationship between the TCO and thickness of the compensation layer. At some value, the TCO crosses from negative to positive value. In FIG. 6, the TCO crosses over from negative to positive value around the normalized value of 1.9. Accordingly, by selecting a thickness of the compensation layer, the TCO can be reduced to zero at that specific thickness.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:
1. A microelectromechanical ("MEMS") force sensor for providing temperature coefficient of offset (TCO) compensation, comprising:
    a sensor substrate configured to receive an applied force, wherein the sensor substrate comprises a top surface and a bottom surface opposite thereto;
    a package substrate;
    a solder bump that connects the sensor substrate to the package substrate;
    a sensing element arranged on the bottom surface of the sensor substrate, wherein the sensing element is configured to convert a strain on the bottom surface of the sensor substrate to an electrical signal that is proportional to the strain, wherein:
        the sensing element comprises a piezoelectric element; and
        the piezoelectric element is sandwiched between the solder bump and the sensor substrate; and
    a compensation layer arranged on the top surface of the sensor substrate, wherein the compensation layer has a thermal coefficient of expansion that is different than a thermal coefficient of expansion of the sensor substrate.

2. The MEMS force sensor of claim 1, wherein the thermal coefficient of expansion of the compensation layer is less than the thermal coefficient of expansion of the sensor substrate.

3. The MEMS force sensor of claim 1, wherein the thermal coefficient of expansion of the compensation layer is greater than the thermal coefficient of expansion of the sensor substrate.

4. The MEMS force sensor of claim 1, wherein the thermal coefficient of expansion of the compensation layer is within a same order of magnitude of a thermal coefficient of expansion of the package substrate.

5. The MEMS force sensor of claim 1, wherein a thickness of the compensation layer minimizes TCO.

6. The MEMS force sensor of claim 5, wherein the TCO is minimized at a value of about zero.

7. The MEMS force sensor of claim 1, wherein a stiffness of the compensation layer minimizes TCO.

8. The MEMS force sensor of claim 1, wherein the thermal coefficient of expansion of the compensation layer minimizes TCO.

9. The MEMS force sensor of claim 1, wherein a combination of a thickness, a stiffness, and the thermal coefficient of expansion of the compensation layer minimizes TCO.

10. The MEMS force sensor of claim 1, wherein the MEMS force sensor is configured for use as strain gauge.

11. The MEMS force sensor of claim 1, wherein the sensing element further comprises a piezoresistive sensing element.

12. The MEMS force sensor of claim 11, wherein the piezoresistive sensing element is positioned over the piezoelectric element and below the sensor substrate.

13. The MEMS force sensor of claim 12, further comprising a dielectric layer, wherein the piezoresistive sensing element is formed on the dielectric layer.

14. The MEMS force sensor of claim 1, further comprising a cap substrate, wherein the sensor and cap substrates are bonded together forming a sealed cavity there between.

15. The MEMS force sensor of claim 1, wherein the MEMS force sensor is configured for electrical and mechanical coupling to the package substrate.

16. The MEMS force sensor of claim 1, wherein the MEMS force sensor is electrically and mechanically coupled to the package substrate, and wherein the package substrate is a printed circuit board (PCB).

17. The MEMS force sensor of claim 1, wherein the MEMS force sensor is electrically and mechanically coupled to the package substrate, and wherein the package substrate is a flexible printed circuit board (FPC).

18. The MEMS force sensor of claim 17, wherein the package substrate is a co-fired ceramic.

19. The MEMS force sensor of claim 1, wherein the compensation layer is formed of at least one of polymer, polyimide, resin, polycarbonate, acrylonitrile butadiene styrene (ABS), silicon oxide, glass, or combinations thereof.

20. The MEMS force sensor of claim 1, further comprising a plurality of sensing elements arranged on the bottom surface of the sensor substrate.

\* \* \* \* \*